G. WHITAKER.
COMBINED COTTON CHOPPER AND CULTIVATOR.
APPLICATION FILED AUG. 11, 1921.

1,407,240.

Patented Feb. 21, 1922.

George Whitaker
Inventor

John M Spellman
Attorney

UNITED STATES PATENT OFFICE.

GEORGE WHITAKER, OF BROWNWOOD, TEXAS.

COMBINED COTTON CHOPPER AND CULTIVATOR.

1,407,240.

Specification of Letters Patent. Patented Feb. 21, 1922.

Application filed August 11, 1921. Serial No. 491,605.

*To all whom it may concern:*

Be it known that I, GEORGE WHITAKER, a citizen of the United States, residing at Brownwood, in the county of Brown and State of Texas, have invented certain new and useful Improvements in Combined Cotton Choppers and Cultivators, of which the following is a specification.

This invention relates to new and useful improvements in cotton choppers and pertains more particularly to a combined cotton chopper and cultivator.

The principal object of the invention is the novel construction and arrangement of its parts whereby the operation of the blades of the cotton chopper may be instantly and easily controlled from the seat of the vehicle, such operation being effected by throwing the chopping blades into and out of gear with the driving mechanism, the chopper being disposed in front of the driver's seat and controlled and operated therefrom.

Other objects and advantages will become apparent as the description of the invention proceeds, reference being had to the following description, taken in connection with the accompanying drawings forming part hereof in which—

Referring more in detail to the drawings, 1 denotes the frame of a cultivator supported upon the wheels 2—2.

Secured to the frame are cultivator beams 3—3 carrying cultivator shovels 4—4. The vehicle may be either drawn by animals or tractor as preferred by means of the tongue 5.

Figure 1:
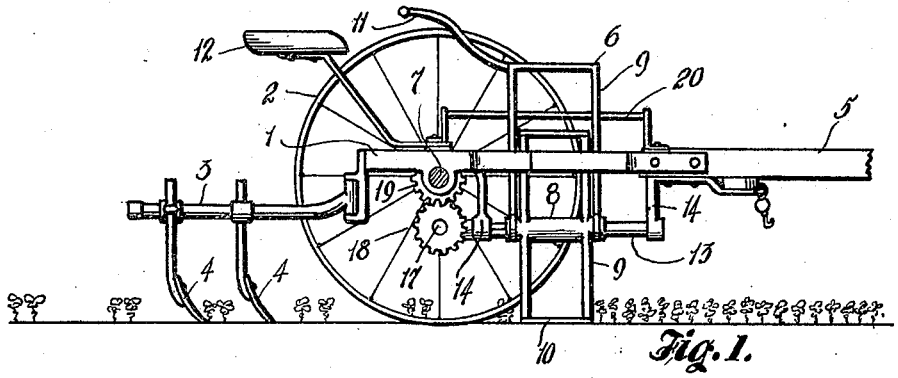
Figure 1 is a side elevational view of a combined cotton chopper and cultivator embodying my invention, one of the supporting wheels removed for better illustration.
Figure 2:
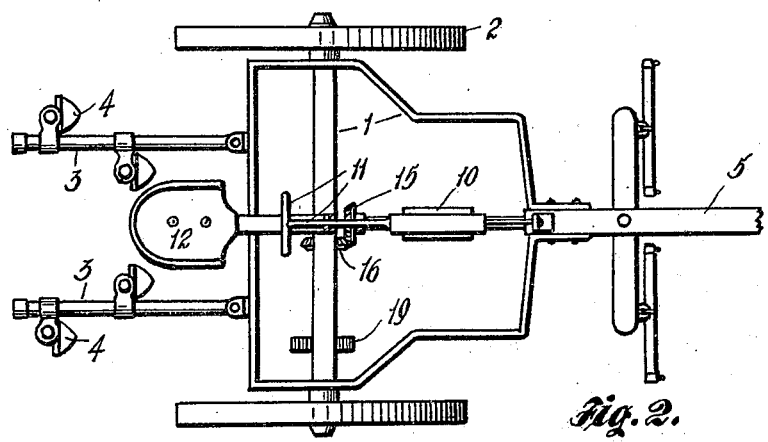
Figure 2 is a top or plan view.
Figure 3:
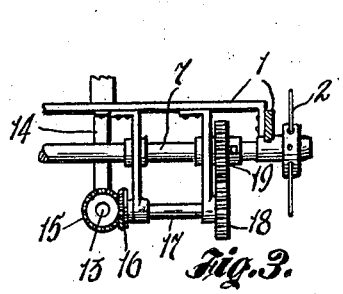
Figure 3 is a detail sectional view of the gears and shafts for driving the chopper blades.
Figure 4:
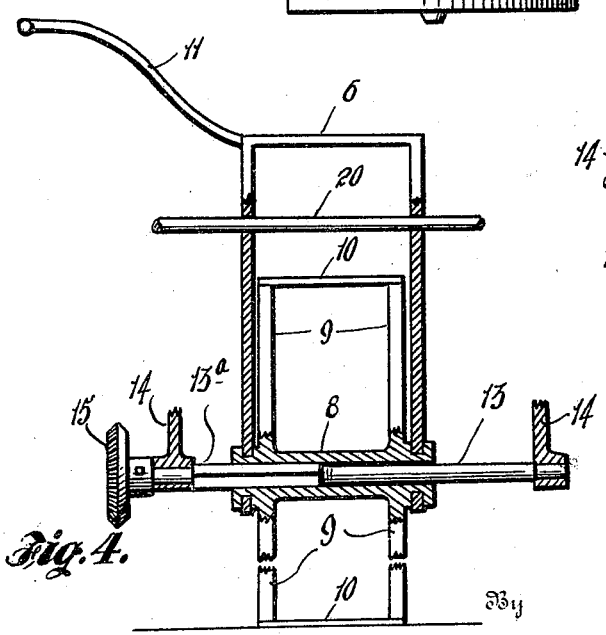
Figure 4 is an enlarged detail sectional view of the chopper and frame.

The invention while combining the double features of a cotton chopper and cultivator is principally intended to provide a more efficacious means for chopping cotton, having in view the instant and quick control of the cotton chopper blades; and in carrying out the invention there is provided a sliding frame 6 which, as illustrated in Figure 1, is located in front of the axle 7. The frame 6 is secured to the tubular hub 8 of a chopper having the radials 9—9 and carrying blades 10—10 for chopping or blocking out the cotton as illustrated in Figure 1. The sliding frame 6 has a handle 11 within reach of the driver occupying a seat 12, the frame adapted to be moved forward and backward upon a shaft, one half of which is rounded at 13 and squared at $13^a$ for the balance of its length and has its ends seated in supports 14 connected to the frame 1. One end of this shaft is provided with a bevel gear wheel 15, which is arranged to mesh with a similar bevel gear 16 carried on the inner end of a shaft 17. The outer end of shaft 17 carries a gear wheel 18 also arranged to mesh with a gear wheel 19, the gear wheel 19 being secured to the axle 7 and through which the drive or supporting wheels 2—2 revolve the shaft 13 to rotate the chopping blades 10—10 which may be two or more in number, only two being shown by preference.

A rod 20 secured to the frame 6 keeps the frame in alinement with the tubular hub 8.

In operation, as the machine is propelled through a field of cotton, the cultivator shovels will work the soil in the usual way, and the blades 10—10 will block or chop out the cotton as illustrated in Figure 1, as the drive wheels in connection with the gear wheels and shafts cause the blades to revolve. When desired the blades may be made to cease to revolve by moving the sliding frame 6 forward upon the rounded surface of shaft 13, which will throw the gear wheels 15 and 16 out of mesh. A reverse operation will cause the blades to revolve again. This operation can be made quickly and complete control of the chopping operation be had at all times. While only two blades are shown in the drawing any desired number may be used.

What is claimed is—

1. A cotton chopping and cultivating machine, said machine having a plurality of chopping blades secured to and arranged to revolve with a tubular hub member, said hub member carried on a shaft connected to gears driven by the motion of the machine, means for moving the frame and throwing the blades in and out of gear, in combination with cultivator shovels for working the soil.

2. A cotton chopping and cultivating machine, said machine having a drive shaft geared to the axle of the machine and adapted to revolve as the machine is moved, a tubular hub member carried on said drive shaft, a plurality of blades secured thereto for chopping and blocking out cotton, a frame connected to said hub member and having a handle for operating from the driver's seat; a portion of said drive shaft adapted to closely fit the tubular hub member when desired to rotate the blades and when thrown out of gear to allow the hub member to cease revolving; in combination with the cultivator shovels carried on the machine to the rear of the revolving chopper blades for cultivating the soil.

In testimony whereof I have signed my name to this specification.

GEO. WHITAKER.